Feb. 13, 1951  A. J. CAWLEY  2,541,860
ROAD ENGAGING MEANS FOR AUTOMOBILES
Filed June 11, 1945
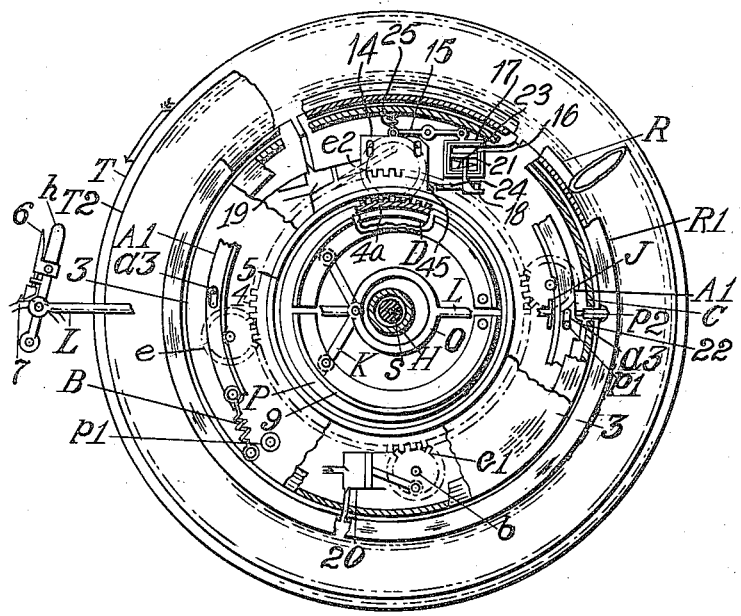
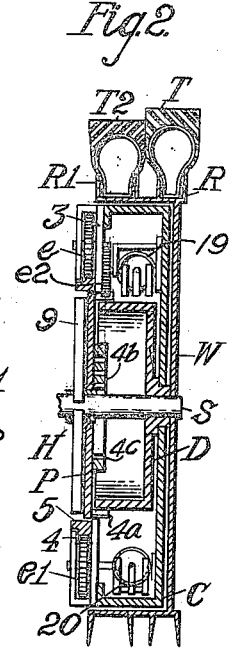
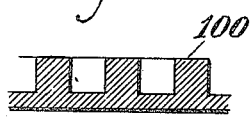
*Aloysius J. Cawley*
INVENTOR.

Patented Feb. 13, 1951

2,541,860

UNITED STATES PATENT OFFICE 2,541,860

ROAD ENGAGING MEANS FOR AUTOMOBILES

Aloysius J. Cawley, Pittston, Pa.

Application June 11, 1945, Serial No. 598,769

10 Claims. (Cl. 152—420)

The invention aims to do away with all of the objectionable features of the present day tire chains, which constitute the present day auxiliary road engaging means, in that the road engaging means may be applied or removed in a fraction of a second, while the car is in full motion, by utilizing the energy of the motor which operates the car.

To provide a road engaging means which may be applied to a standard, present-day automobile, after a simple machining operation on the brake drum, in order to prepare it for attachment thereto.

To provide an auxiliary road engaging means which may be applied by means of friction shoes borne on the stationary backing plate.

A modification in which an auxiliary tire whose tread surface is provided with road engaging elements, and which is partially deflated when not in road engagement, and which is brought into road engagement by inflation.

Also, a modification in which the regular tire is inflated while the car is in motion by manipulating a lever at the driver's seat.

Also, means for maintaining the regular tire in full inflation automatically, while the car is in motion, the decrease in pressure of the air in the tire acting to bring a tire inflating element into operation.

An auxiliary road engaging means and associated wheel which act to reinforce each other, as they are in intimate contact throughout their peripheries.

This application is a continuation-in-part application of my application Serial No. 247,281, filed December 22, 1938, for Road Engaging Means for Automobiles, or the like, and which has been issued on June 12, 1945, as Patent No. 2,377,923.

Those objects are attained by means of the mechanisms illustrated in the accompanying drawings, in which Figure 1 is an elevational view of the invention applied to an automobile.

Figure 2 is a side view partly in cross section of Figure 1.

Figure 3 is a cross section of one well known type of road engaging surfaces.

Figures 1 and 2 illustrate the invention and disclose the main tire T and the auxiliary tire T2 mounted on the same rim. However, two separate wheels, each having two separate tires, and mounted on the same shaft may also be used. Every one is familiar with the great loss of life due to the so-called "blow out" of tires. This is due to the fact that the diameter of the tire suddenly reduces from that of full inflation to absolute, or partial, deflation. The wheels are then of different diameter, resulting in turning of the wheels toward the side of the road and the upsetting of, or the crushing of, the car against external objects. The regular tire T is shown in the drawing with the auxiliary tire T2 in the "off" position of the road engaging means. The regular tire T is of larger diameter than the auxiliary tire T2, due to the deflation of the latter. Rod L, by means of hand pressure exerted on the hand lever $h$, forces the links K and consequently the shoes 9 against the friction surface 5 of wheel 4. Wheel 4 is supported by means of wheels $e$, $e!$, etc. S is the shaft, H is the housing, and O is the circle formed in the rod L which passes around shaft housing H. The rim of the regular tire is shown at R, while that of the auxiliary wheel is shown at R!. The brake drum is shown at D and the backing plate at P. As the wheel 4 is retarded in its motion by friction exerted upon surface 5 by the shoes 9, it causes wheel $e!$ to rotate. The air pump 20 is attached to this wheel and is rotated thereby to inflate tire T2, as shown by the usual connection. Thus tire T2 is brought up to the same, or greater, inflational diameter than tire T, and the special road engaging means on its surface is brought into road engagement. Obviously, the greater the speed at which the car is moving, the greater the speed of inflation of the auxiliary tire that is possible. The rate of inflation may be regulated by the amount of pressure upon the friction surface 5 by the shoes 9. Pump 20 is clearly shown as connected to the tire T2, similar to ordinary tire pumps. Thus, the special road engaging means, which may not have a long life, i. e., by a reduction in their effectiveness by wear, will be used only when necessary, and the regular tire is used alone when the auxiliary tire is not needed. For instance, special tire surfaces are often made of fine vanes, which especially grip wet concrete road surfaces. They may wear out rather rapidly and by means of the invention, they are not constantly subjected to wear, but only when needed. The auxiliary tires may also be provided with sections of regular chains on their road contact surface, and only inflated when such chains are needed for road contact. This saves the breaking of chains through wear on concrete and other hard roads when not covered with snow, ice, etc., or other skid causing elements. The auxiliary tire may also be provided with the very special large ridges 100 as used on the well known "ground grip" tires as illustrated in Figure 3. The coarse ridges are placed diagonally on the tire surface. These are, therefore, used only when needed, and are thus saved useless wear. Also, such heavy ridged tires give great vibration on hard roads, such as clean concrete roads, even giving the same sensation as that given by "flat tires." The invention removes them from road engagement when not required.

It is very important to point out here that, in one modification, the apparatus here described may also be used to inflate the ordinary, or main, tire while the car is in motion by simply connecting the pump 20 to the ordinary tire by the usual tube connection. The pump 20 is provided with an adjustable release valve, so that, when the desired pressure is obtained in the tire, there is no further increase in pressure. The escape of air from this valve could be heard by the operator within the car. Or, even a small orifice designed to give a true whistling sound is provided in one modification, thus informing the operator that the tire is sufficiently inflated.

Counterpoises may, of course, be provided opposite the pumps 20 and 19 (to be described shortly), or the two pumps will be, in one modification, counterpoised against each other by disposing them at opposite points on the periphery of the wheel, as shown in Figure 1.

To deflate the auxiliary tire, and thus remove the road engaging means from the position of road engagement, the rod L is pushed to the right (by hand lever $h$), when shoe J, disposed on the end of the rod, comes in contact with rings A1's friction surface, and retards its rotation, if the car is in motion. The ring A1 is provided with a cam 22, which thus comes in contact with the valve stem $p2$ and pushes it inwards, causing the escape of air and consequent deflation. The ring A1 is provided with a series of slots $a3$, in which the pins $p1$ travel while the ring A1 moves against the action of the springs B, which normally hold the cam 22 out of engagement with valve stem $p2$. Two sections of the ring A1 are shown at the right and left of Figure 1. It will be noted that wheels $e$ are used to support the wheel 4.

It has been stated above that pump 20 may be used to inflate the regular tire T while the car is in motion, by simply connecting it to the tire by a screw joint, for instance. The apparatus just described is shown mostly in cross section in Figure 2. The relative diameters of the tires T and T2 are shown exagerated for purposes of clearness. It will be seen that tire T2 is not in road engagement in this figure, and is saved unnecessary wear. It is well known that chains, for instance, do not wear out nearly so quickly when in contact with soft, or dirt, or snow covered roads. Their wear is exceedingly rapid on clean concrete and similar surfaces. In winter it is frequently necessary for a person to travel, during various journeys, over alternate sections of clean, and snow and ice covered roads. The chains must be kept on the tires, otherwise they cannot travel through snowy sections, and the ordinary chain is too cumbersome and takes too much time and effort to remove at frequent intervals. With the present invention, the "chains" may be removed and applied several times in one minute if necessary, and while the car is in motion.

Figures 1 and 2 illustrate a pump connected to the main or regular tire T. The inner periphery of the plate P is provided with gear teeth shown at $4a$ in Figures 1 and 2, which mesh with wheel $e2$, and the latter, by its rotation, drives the air pump 19. The pump is mounted upon a movable guide frame 14 provided with grooves, in which flanged guides fastened to the cuplike member C travel. Lever 15, which is provided at its center with a fulcrum, has the form of a hollow square, in which the governor valve is located. The piston of the valve 21 moves with the lever, as it is fixedly attached to it. The piston valve 21 is normally forced inwards by the action of springs 23. The piston rod is provided with a cam 18, which engages with the latch 24 when the piston moves upward into the cylinder of the valve 21. Latch 24 engages with the guide frame 14 supporting pump 19, and is actuated by the cam 18. The governor valve 21 is connected by the tube 16 to the regular tire. When the pressure in the tire is normal, the piston of the pump is pushed outward of the cylinder of the valve 21, against the spring 23. The hollow square lever 17 is attached to the piston rod of the governor valve, which bears the cam 18. Spring 23 counterbalances the pressure of the air within the tire T. In the figure, the pressure in the tire is low and the piston has traveled upwards within the cylinder of the valve 21. The cam 18 has released the latch 24 from catch 45, rendering frame 14 free to move downwards in the figure, under action of the spring 25, thus forcing wheel $e2$ into engagement with gear teeth $4a$ on the plate P. As the plate P is stationary, when the car is moving, there is a rotation of the wheel $e2$, which operates pump 19. As the pump 19 is fastened to the cuplike portion of C, when its piston travels inwards, and as square 17 is fastened to its piston rod, the right hand side of pivoted lever 15 moves upwards and the left hand side downwards. Thus, wheels $e2$ and $4a$ are brought into engagement. When the tire pressure has raised sufficiently to bring it to normal inflation, the piston of the valve 21 moves outward, moving the hollow square 17 downward and consequently the right hand side of lever 15 also moves downward, while the left hand portion of lever 15 moves upward and carries the base 14 with it, thus throwing wheel $e2$ and teeth $4a$ out of engagement, and stopping the pump. As the rod of the valve 21 travels outward from the cylinder, by action of its cam 18, rod 24 is permitted to slide to the left under the action of the spring (not shown), and engages with the projecting latch 45, and the base 14 is held out of engagement position, so that wheels $e2$ and $4a$ are prevented from meshing until the tire pressure again falls below normal. The two pumps, 19 and 20, are disposed on opposite sides of the rotating element and both are within the hollow wheel, more clearly shown in Figure 2.

Figure 2 also shows the two tires T and T2 mounted upon the same wheel W by means of a two-element rim R and R1. If the regular tire T should blow out while the car is travelling at high speed, then T2, which is somewhat softer and of consequent smaller diameter, even though not in road engaging inflation, would act to prevent the car from swerving off the road.

In another modification, tire T2 is mounted upon a separate wheel, which latter is also mounted upon shaft S.

Having described my invention, I claim as new and desire to secure by Letters Patent:

1. A road engaging apparatus consisting of a rotatable member, an auxiliary road engaging means including an auxiliary tire bearing special road engaging elements on its tread and means including an air pump for bringing said road engaging means into road engagement.

2. A road engaging apparatus consisting of a rotatable member, an auxiliary road engaging means including an auxiliary tire, means including an inflating element for bringing said auxiliary road engaging means into road engagement and means for releasing said auxiliary road engaging means from road engagement including means for deflating said tire.

3. A road engaging apparatus consisting of a rotatable member, an auxiliary road engaging means including an auxiliary tire, means for bringing said auxiliary road engaging means into road engagement including an inflating element and a friction surface borne on said auxiliary road engaging means and a stationary friction member.

4. An apparatus attached to a car for inflating a tire while said car is in motion, including a tire, a pump operatively connected to said tire and means including stationary frictional shoes and a rotatable wheel surface for bringing said pump by means of the energy of motion of said car into operation to inflate said tire.

5. A road engaging means including a brake drum, a demountable wheel bearing a pneumatic tire mounted upon said brake drum, an inflating element mounted independent of said wheel on said brake drum, said inflating element being pneumatically connected to said tire and means in cooperative relation with said inflating element for bringing said inflating element into operation to inflate said tire while said wheel rotates.

6. A road engaging means including a brake drum, a demountable wheel bearing a pneumatic tire mounted upon said brake drum, an inflating element mounted independently of said wheel on said brake drum, said inflating element being pneumatically connected to said tire and means under control of the pressure in said pneumatic tire and in cooperative relation with said inflating element for bringing said inflating element into operation to inflate said tire while said wheel rotates.

7. A claim according to claim 5 in which said means for bringing said inflating element into operation includes a hollow gear wheel bearing a friction surface and gear teeth.

8. A claim according to claim 5 in which said means for bringing said inflating element into operation includes a hollow gear wheel bearing a friction surface and gear teeth and friction shoes in operative engagement with said friction surface.

9. A claim according to claim 5 in which said means for bringing said inflating element into operation includes a hollow gear wheel bearing a friction surface and gear teeth and friction shoes in operative engagement with said friction surface, a gear wheel in cooperative relation with said inflating element and engaging said gear teeth.

10. A claim according to claim 5 in which said means for bringing said inflating element into operation includes a hollow gear wheel bearing a friction surface and gear teeth and friction shoes in operative engagement with said friction surface, a gear wheel in cooperative relation with said inflating element and engaging said gear teeth and manual means for bringing said shoes into engagement with said friction surface.

ALOYSIUS J. CAWLEY.

REFERENCES CITED

The following references are of record in the file of this patent:

UNITED STATES PATENTS

| Number | Name | Date |
|---|---|---|
| 894,586 | Brest | July 28, 1908 |
| 1,611,710 | Ayers | Dec. 21, 1926 |